United States Patent [19]

Cooper et al.

[11] 3,893,997

[45] July 8, 1975

[54] PSEUDODISACCHARIDE INTERMEDIATES

[75] Inventors: David J. Cooper, Downingtown, Pa.; Jerry A. Weisbach, Cherry Hill, N.J.

[73] Assignee: SmithKline Corporation, Philadelphia, Pa.

[22] Filed: July 1, 1974

[21] Appl. No.: 484,495

[52] U.S. Cl............ 260/210 R; 424/180; 424/182; 260/211 R
[51] Int. Cl.²........................................ C07C 47/18
[58] Field of Search.................. 260/210 R, 210 AB

[56] References Cited
OTHER PUBLICATIONS
Umezawa, H. et al., Sgn. of 3'4'-dideoxy neamine . . ., J. of Antibiotics, v:24, p. 711–712, 1971.

*Primary Examiner*—Johnnie R. Brown
*Assistant Examiner*—Cary B. Owens
*Attorney, Agent, or Firm*—Stuart R. Suter; Alan D. Lourie; William H. Edgerton

[57] ABSTRACT

Epoxides of pseudodisaccharides such as neamine, paromamine and the like are prepared. These compounds are useful intermediates to prepare other pseudodisaccharides which have antibacterial activity.

12 Claims, No Drawings

PSEUDODISACCHARIDE INTERMEDIATES

This invention relates to derivatives of pseudodisaccharides which are useful as intermediates for compounds which have antibacterial acitivity. In particular, the compounds are 3',4'-neamine epoxides and 3',4'-paromamine epoxides and the like.

Aminoglycosides are an important group of antibiotics which have good activity particularly against some Gram-negative organisms which have been insensitive to other antibiotics. However, the aminoglycosides have weaknesses which include some undesirable toxicities and the ease with which resistant strains develop. Chemical modifications of the naturally occurring aminoglycosides have been attempted in order to obtain compounds in which these problems will be diminished, but these attempts have been limited. An object of this invention is to provide intermediates which would make extensively chemically modified aminoglycosides readily available.

The compounds of this invention are represented by the following structures:

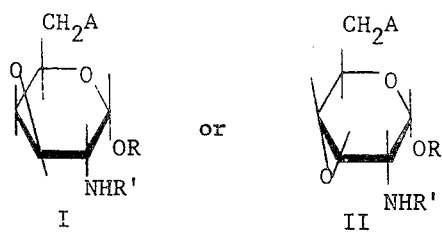

where
R is an aminocyclitol residue,
R' is an amino protecting group or hydrogen,
A is OR'', NHR', or NYR',
Y is lower alkyl of 1 to 4 carbon atoms, and
R'' is a hydroxy protecting group or hydrogen.

Structure I and II differ only in the stereo-chemistry of the epoxide group. Structure I will be referred to as the galacto isomer and structure II as the allo isomer.

The structure of the aminocyclitol residue may vary widely. The term aminocyclitol refers to a cyclohexane moiety substituted with hydroxy and amino groups. Examples of aminocyclitols within the scope of this invention are streptamine, 2-deoxystreptamine, 1-N-(4-amino-2-hydroxybutyryl)-2-deoxystreptamine, and the like. The hydroxy and amino groups of the aminocyclitol may be protected with normal protecting groups, such as those defined below, during the preparation and further reactions of the epoxide.

The amino protecting groups defined as R' include acetyl, tosyl, benzoyl, mesyl, methylsulfonyl, dichloroacetyl, trichloroethoxycarbonyl, benzyloxycarbonyl, t-butoxycarbonyl, ethoxycarbonyl, methoxycarbonyl, the enamine adduct of dimedone and other groups known and used in the arts of carbohydrate or peptide synthesis. Hydroxy protecting groups include, in addition to most of the above amino protecting groups, benzyl, trityl, methyl, tetrahydropyranyl, cyclohexylidene, isopropylidene, trifluoroacetyl, nitrate, methylene, carbonyl and other groups used in the carbohydrate art. The choice of the protecting group depends on whether a hydroxy or amino group is being protected, subsequent reaction conditions, and conditions for removal. This choice is within the ability of one skilled in the art.

Neamine is the common name for 4-O-(2,6-diamino-2,6-dideoxy-α-D-glucopyranosyl)-2-deoxystreptamine, which has the following structural formula:

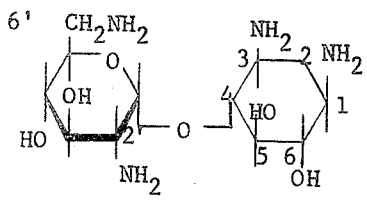

Paromamine is the common name for 4-O-(2-amino-2-deoxy-α-D-glucopyranosyl)-2-deoxystreptamine.

The compounds are prepared by the reaction of a 3'-eno derivative with an epoxidation reagent, such as m-chloroperbenzoic acid, as illustrated by Scheme I.

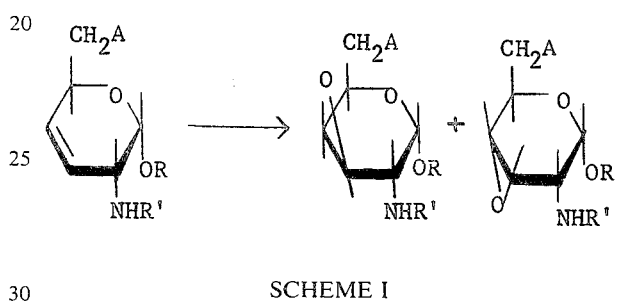

SCHEME I

The 3'-eno derivatives are prepared from the 3',4'-dihydroxy derivative by known methods, for example, as reported in *J. Antib.*, 24, 711 (1971). In particular, 5,6-O-cyclohexylidene-3',4'-dideoxy-3'-eno-tetra-N-methoxycarbonylneamine is treated with m-chloroperbenzoic acid in benzene to give both isomers. The isomers can be separated using high pressure liquid chromatography or thin layer chromatography. The starting eno compound is prepared as described in *J. Antib.*, 24, 711 (1971).

Alternatively, the isomers can be prepared separately by the processes outlined in Schemes II and III. The 3',4'-dihydroxy derivatives are also prepared as reported in *J. Antib.*, 24, 711 (1971) or by analogous procedures.

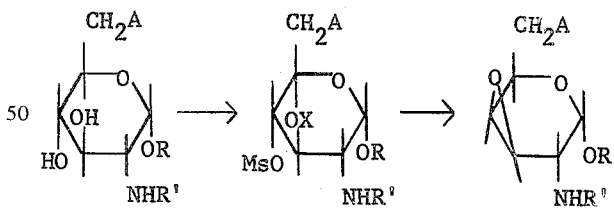

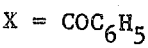

SCHEME II

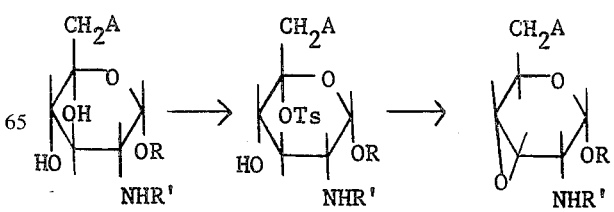

SCHEME III

The galacto isomer is prepared as outlined in Scheme II from the 3',4'-dihydroxy derivative, for example, 5,-6-O-cyclohexylidenetetra-N-methoxycarbonylneamine. Treatment of the dihydroxy derivative with benzoyl chloride in an organic amine solvent such as pyridine gives the 3'-benzoyl-4'-hydroxy derivative. The reaction of this compound with mesyl chloride by standard methods gives the 3'-benzoyl-4'-mesyl compound which on treatment with base, such as methoxide ion, gives the galacto isomer.

The allo isomer is also prepared from the same 3',4'-dihydroxy derivative as outlined in Scheme III. Reaction of the dihydroxy compound with p-toluenesulfonyl chloride gives the 3'-tosyl derivative which on treatment with base gives the allo isomer.

The epoxides are useful intermediates for the preparation of compounds with antibacterial activity. The epoxide may be opened with nucleophiles, such as azide ion, to give compounds which have antibacterial activity. For example, 3',4'-galacto-anhydro-5,6-O-cyclohexylidene-tetra-N-methoxycarbonylneamine is reacted with sodium azide to give the epoxide opened product which is hydrogenated in the presence of palladium on carbon and then deblocked to give a single product. The structure of this compound is believed to be 4-amino-4-deoxyneamine based on chemical considerations as well as physical data. This compound exhibited antibacterial activity against strains of *E. coli*, *Kleb. pneumoniae*, *Salmonella paratyphi*, *Proteus morgani*, and *Enterobacter cloacae*. Similarly, treatment of the 3',4'-allo-anhydro compound with sodium azide gives two isomers, the 4-azido-3-hydroxy isomer with both groups in the axial position and the 3-azido-4-hydroxy isomer with both groups in the equatorial position. The 4-azido isomer is separated and reduced to give the 4-amino derivative which had antibacterial activity against *Pseudo. aeruginosa*.

The following examples illustrate the invention but are not to be construed as limiting the scope thereof.

EXAMPLE 1

To a solution of 5,6-O-cyclohexylidene-3',4'-dideoxy-3'-eno-tetra-N-methoxycarbonylneamine (0.5 g) in benzene (50 ml) is added m-chloroperbenzoic acid (0.5 g). The solution is stirred for three days at room temperature and then concentrated. The residue is chromatographed on a silica gel column (20 g) with chloroform-ethanol (97:3) as eluant. The solid 3',4'-anhydro-5,6-O-cyclohexylidene-tetra-N-methoxycarbonylneamine is recrystallized from benzene; mp 140°–44° $[\alpha]_D^{25}$ + 2.4° (1,CHCl$_3$). This product is a mixture of allo and galacto isomers as shown by tlc analysis on silica gel with ether-acetonitrile (7:3) as eluant.

The two isomers can be separated by high pressure liquid chromatography using a column of "Microporasil" (10 $\mu$) (Waters Associates, Framingham, Mass.) or "Lichrosorb" (10 $\mu$) (Altex Scientific, Berkley, Calif.) and a chloroform: methanol (95:5) solvent system. On a 25cm × 1cm i.d. column at a flow rate of 3 ml/min up to 300 mg of the epoxide can be separated.

EXAMPLE 2

To a stirred solution of 5,6-O-cyclohexylidene-tetra-N-methoxycarbonylneamine (50.0 g, 0.078 mol) in dry pyridine (150 ml) and freshly distilled chloroform (100 ml) is added dropwise, over a 6 hour period at room temperature, a solution of p-toluenesulfonyl chloride (25.6 g, 0.134 mol) in chloroform (70 ml). The reaction is stirred overnight, diluted with ice cold brine and extracted with ethyl acetate. The extracts are washed with brine, 10% acetic acid (until pH<7) and saturated NaHCO$_3$ (until pH>7). The dried extracts are evaporated to give the 3'-tosyl-4'-hydroxy derivative which is chromatographed on a silica gel column using chloroform and methanol (1–3%) in chloroform as eluant.

The product (4.3 g, 5.45 mmol) is dissolved in chloroform (60 ml), cooled in an ice bath and then treated with a solution of sodium (0.5 g, 21.8 mmol) in dry methanol (15 ml). After 28 hours at 5°–10°C the reaction is diluted with cold brine (25 ml) and partitioned with ethyl acetate. The organic phase is washed with brine, dried, and evaporated to a solid which is recrystallized from acetone-ether to give 3',4'-allo-anhydro-5,6-O-cyclohexylidene-tetra-N-methoxycarbonylneamine.

EXAMPLE 3

Benzoyl chloride (53.7 g, 0.38 mol) is added dropwise to a solution of 5,6-O-cyclohexylidene-tetra-N-methoxycarbonylneamine (106.5 g, 0.168 mol) in pyridine (600 ml) at $-11°C \pm 1°$. Water (100 ml) is added and then saturated NaHCO$_3$ until pH 7-8 is obtained. The solution is extracted with ethyl acetate which is dried and concentrated in vacuo to give a residue which is triturated with toluene and ether. The solid is recrystallized from ethyl acetate to give the 3'-benzoyl-4'-hydroxy derivative.

A solution of the above product (27.5 g, 0.0373 mol) and triethylamine (15.1 g, 0.149 mol) in a mixture of chloroform (350 ml) and tetrahydrofuran (120 ml) is treated dropwise at $-10°C$ with mesyl chloride (11 g, 0.095 mol). The solution is diluted with saturated NaHCO$_3$ (400 ml) at about 0° and then extracted with chloroform. The dried extracts are evaporated in vacuo to a residue which is reprecipitated from chloroform-petroleum ether to give the 3'-benzoyl-4'-mesyl compound.

A solution of sodium (16.1 g, 0.7 mol) in methanol (500 ml) is added at room temperature to a solution of the 3'-benzoyl-4'-mesyl compound (80 g, 0.098 mol). After 1 hour solid NaHCO$_3$ and then glacial acetic acid (30 ml) are added. The resulting solution (pH ~ 7) is evaporated to give a residue which is partitioned between chloroform and water. The aqueous phase is separated and extracted with chloroform. The combined chloroform phases are washed with water, dried, and concentrated to a residue which is dissolved in methylene chloride (400 ml) and added with stirring to petroleum ether (4 l). The solid 3',4'-galacto-anhydro-5,6-O-cyclohexylidene-tetra-N-methoxycarbonylneamine (49 g) is collected by filtration and dried in vacuo.

EXAMPLE 4

5",6-Di-O-acetyl-1-N-[(S)-2-acetoxy-4-phthalimidobutyryl]-3, 2',6'-tri-N-benzyloxycarbonyl-2",3"-O-cyclohexylidene-3',4'-dideoxy-3'-enoribostamycin [*J. Antib.*, 26, 307

(1973)] is treated with 0.32 N methanolic hydrochloric acid according to the published procedure [*J. Amer. Chem. Soc.*, 81, 3480 (1959)] to give 6-O-acetyl-1-N-[(S)-2-acetoxy-4-phthalimidobutyryl]-3,2',6'-tri-N-benzyloxycarbonyl-3',4'-dideoxy-3'-enoneamine. This product is treated with an excess of hydrazine hydrate in 80% ethanol at 60° for 2 hours and the solution is evaporated to give 1-N-[(S)-4-amino-2-hydroxybutyryl]-3,2',6'-tri-N-benzyloxycarbonyl-3',4'-dideoxy-3'-enoneamine. The amine group is protected by reacting the product with benzyloxycarbonyl chloride in 70% aqueous methanol containing triethylamine. Treatment of the resulting 3'-eno product with m-chloroperbenzoic acid according to the procedure of Example 1 gives 3',4'-anhydro-1-N-[(S)-4-benzyloxycarbonylamino-2-hydroxybutyryl] -3,2',6'-tri-N-benzyloxycarbonylneamine.

EXAMPLE 5

Paromamine in 10% sodium carbonate is treated with a two-fold excess of methyl chloroformate for 2 hours. The tri-N-methoxycarbonylparomamine is filtered off and recrystallized from aqueous dioxane.

Tri-N-methoxycarbonylparomamine is treated with p-toluenesulfonyl chloride in dry pyridine at 0° for 4 hours and then at room temperature overnight to give the 6'-O-tosylparomamine derivative. This product is converted to 5,6-O-cyclohexylidene-tri-N-methoxycarbonyl-6'-O-tosylparomamine and then to 5,6-O-cyclohexylidene-3',4'-dideoxy-3'-eno-tri-N-methoxycarbonyl-6'-O-tosylparomamine using the procedures analogous to those published in *J. Antib.*, 24, 711 (1971) for the neamine analog. Reaction of the 3'-eno product with m-chloroperbenzoic acid according to the procedure of Example 1 gives 3',4'-anhydro-5,6-O-cyclohexylidene-tri-N-methoxycarbonyl-6'-O-tosylparomamine.

The separate allo and galacto isomers are prepared from 5,6-O-cyclohexylidene-tri-N-methoxycarbonyl-6'-O-tosylparomamine according to the procedure of Examples 2 and 3 respectively.

EXAMPLE 6

A solution of 3',4'-allo-anhydro-5,6-cyclohexylidene-tetra-N-methoxycarbonylneamine (6.25 g, 0.01 mol) and sodium azide (5.2 g, 0.08 mol) in water (20 ml) is refluxed for 24 hours. The solution is concentrated to ca. 5 ml. and the residue diluted with brine and ethyl acetate. The ethyl acetate is separated, washed with brine, dried and concentrated to a mixture of the 3'-azido-4'-hydroxy and 4'-azido-3'-hydroxy isomers. Column chromatography on silica gel (220 g) with a methanol (1-2%) in chloroform gradient as eluant gave the separate isomers: 4-O-(4-azido-2,4,6-trideoxy-2,6-methoxycarbonylamino-α-D-gulopyranosyl)-5,6-O-cyclohexylidene-2-deoxy-1,3-N-methoxycarbonyl-D-streptamine (2.9 g, 44%), mp 125°-30°, $[\alpha]_D^{25}$ − 2.3° (c 1, $CHCl_3$); 3'-azido-3'-deoxy-5,6-O-cyclohexylidene-tetra-N-methoxycarbonylneamine (0.7 g, 11%), mp 134–137°$[\alpha]_D^{25}$ + 3.4° (c 0.5,$CHCl_3$).

The 4'-azido isomer (2.4 g, 3.6 mmol) is dissolved in dry dioxane (40 ml) and hydrogenated at 60 psi over 10% Pd on carbon catalyst (2.0 g) for 18 hours. The solution is filtered and concentrated and the residue is azetroped with benzene. The crude product is reacted with a mixture of pyridine (20 ml) and acetic anhydride (10 ml) at room temperature for 48 hours. The reaction is diluted with cold brine solution and then extracted with ethyl acetate. The extracts are washed with 10% acetic acid, water, sodium, bicarbonate solution, and brine solution, dried, and concentrated to the diacetylated product which is purified by chromatography on silica gel with methanol-chloroform (2:98) as eluant. The resulting crystalline solid has mp 162°-5°.

The above product (710 mg) is stirred with methanol (15 ml) and 3N HCl (12 drops) for 2 hours at room temperature. The solvents are removed in vacuo and the residue is azetroped once with ethanol. To the residue is added simultaneously hot 1N $Ba(OH)_2$ (30 ml) and warmed dioxane (300 ml). The warm mixture, protected under a nitrogen atmosphere, is placed in a preheated oil bath (105°C) and stirred for 18 hours. The reaction is cooled, diluted with water (50 ml) and saturated with $CO_2$. After filtration, the solution is concentrated to a residue which is chromatographed on a polymethacrylic acid ion exchange resin ["Amberlite CG-50" ($NH_4^{115}$)]. The column is washed with water and then eluted with a gradient of $NH_4OH$ (0 to 0.5N). The product, 2-deoxy-4-O-(2,4,6-triamino-2,4,6-trideoxy-α-D-gulopyranosyl)-D-streptamine is eluted mainly with the 0.3N $NH_4OH$ fraction and converted to the sulfate salt, m.p. 240°-250°/dec., by acidification of the eluants to pH 3.5 with dilute $H_2SO_4$ and subsequent lyophilization.

EXAMPLE 7

A solution of 3',4'-galacto-anhydro-5,6-O-cyclohexylidene-tetra-N-methoxycarbonylneamine (10 g) and sodium azide (10 g) in 90% aqueous dimethylformamide (100 ml) is heated for 3 hours at 110°-115°C. The reaction is cooled, poured into icewater (300 ml) and extracted with ethyl acetate. The extracts are washed with water, dried and evaporated in vacuo. The single isomer azido-hydroxy product is chromatographed on a silica gel column using chloroform-methanol (97:3) as eluant.

The above product (1.8 g) in methanol (100 ml) is treated with Raney Ni (1 g) and hydrogenated at 50 psi and room temperature for 16 hours. The mixture is filtered and the filtrate is evaporated in vacuo. The resulting solid is refluxed overnight in water (100 ml) containing $Ba(OH)_2·8 H_2O$ (16 g). The hot solution is neutralized with $CO_2$, cooled and filtered. The filtrate is adjusted to pH2 with 6N $H_2SO_4$ and heated for 6 hours at 70°C. The solution is cooled, filtered, adjusted to pH 6 with ammonia and then passed through a column of polymethacrylic acid ion exchange resin in the $NH_4^{115}$ form ("Amberlite IRC-50"). The column is washed with water (1 l) and 0.1N $NH_4OH$ (1 l) and then eluted with 1N $NH_4OH$ (500 ml). The eluates are evaporated to give the product believed to be 4-amino-4-deoxyneamine.

The same product is obtained by heating the epoxide (100 mg) with methanol (10 ml) and concentrated $NH_4OH$ (3 ml) in a sealed autoclave at 54°C overnight. In vacuo evaporation of the reaction solution gave the product.

EXAMPLE 8

5,6-O-Cyclohexylidene-tri-N-methoxycarbonyl-6'-O-tosylparomamine (0.01 mol) is stirred with 20% aqueous methylamine (20 ml) at 50°C overnight. The solution is diluted with saturated brine and extracted with ether. The extracts are washed with water, dried and concentrated to give 5,6-O-cyclohexylidene-tri-N-methoxycarbonyl-6'-N-methylneamine.

The above product is dissolved in 10% sodium carbonate and treated with a two-fold excess of methyl chloroformate for 2 hours at room temperature. The reaction is extracted with ether which is dried and evaporated to give 5,6-O-cyclohexylidene-tetra-N-methoxylcarbonyl-6'-N-methylneamine.

This product is reacted according to the procedure of Example 2 to give 3',4'-allo-anhydro-5,6-O-cyclohexylidene-tetra-N-methoxycarbonyl-6'-N-methylneamine. When the dihydroxy derivative is reacted according to the procedure of Example 3, 3',4'-galacto-anhydro-5,6-cyclohexylidene-tetra-N-methoxycarbonyl-6'-N-methylneamine is obtained.

We claim:

1. A compound of the formula

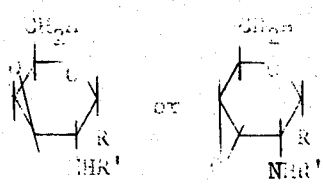

wherein
R is

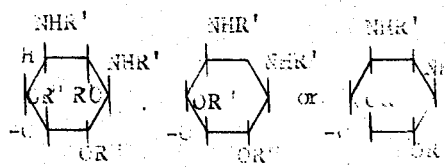

R' is an amino protecting group or hydrogen;
A is OR'', NHR', or NYR';
Y is lower alkyl of 1 to 4 carbon atoms,
R'' is a hydroxy protecting group or hydrogen; and
B is —COCHOR''CH$_2$CH$_2$NHR';

2. A compound as claimed in claim 1 wherein R' is hydrogen, acetyl, tosyl, benzoyl, mesyl, methylsulfonyl, dichloroacetyl, trichloroethoxycarbonyl, benzyloxycarbonyl, t-butoxycarbonyl, ethoxycarbonyl, methoxycarbonyl, phthaloyl, or dimedone adduct; R'' is hydrogen, acetyl, tosyl, benzoyl, mesyl, methylsulfonyl, dichloroacetyl, trichloroethoxycarbonyl, benzyloxycarbonyl, t-butoxycarbonyl, ethoxycarbonyl, methoxycarbonyl, benzyl, trityl, methyl, tetrahydropyranyl, trifluoroacetyl or nitrate or when taken with another R'' group, cyclohexylidene, isopropylidene, methylene or carbonyl; and Y is hydrogen or methyl.

3. A compound as claimed in claim 2 wherein R is

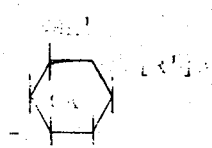

where
R', R'' and B are as defined in claim 2.

4. A compound as claimed in claim 3 being the compound 3',4'-anhydro-5,6-cyclohexylidene-tetra-N-methoxycarbonylneamine.

5. A compound as claimed in claim 3 being the compound 3',4'-anhydro-1-N-[(S)-4-benzyloxycarbonylamino-2-hydroxybutyryl]-3,2',6'-tri-N-benzyloxycarbonylneamine.

6. A compound as claimed in claim 3 being the compound 3',4'-anhydro-5,6-O-cyclohexylidene-tetra-N-methoxycarbonyl-6'-O-tosylparomamine.

7. A compound as claimed in claim 4 being the allo isomer.

8. A compound as claimed in claim 4 being the galacto isomer.

9. A compound as claimed in claim 6 being the allo isomer.

10. A compound as claimed in claim 6 being the galacto isomer.

11. A compound as claimed in claim 7 being the allo isomer.

12. A compound as claimed in claim 7 being the galacto isomer.

* * * * *

UNITED STATES PATENT AND TRADEMARK OFFICE
CERTIFICATE OF CORRECTION

PATENT NO. : 3,893,997
DATED : July 8, 1975
INVENTOR(S) : David J. Cooper and Jerry A. Weisbach It is certified that error appears in the above-identified patent and that said Letters Patent are hereby corrected as shown below:

Column 6, lines 21 and 51; --$NH_4^{115}$-- should read --$NH_4^+$--

Column 7: structures of lines 20-25 read as follows:

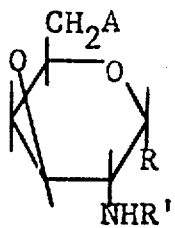 or 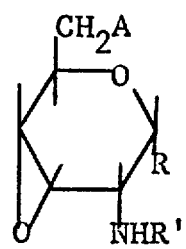

Column 7: structures of lines 30-35 read as follows:

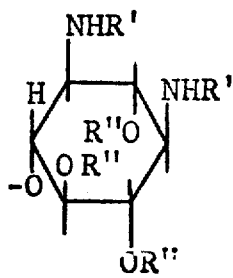 , 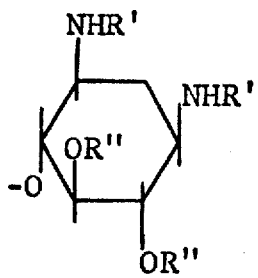 or 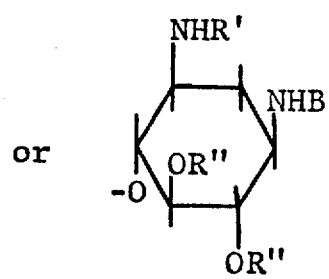

Column 8: structure of lines 15-20 reads as follows:

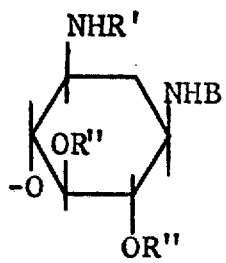

Signed and Sealed this thirtieth Day of September 1975

[SEAL]

Attest:

RUTH C. MASON
*Attesting Officer*

C. MARSHALL DANN
*Commissioner of Patents and Trademarks*